United States Patent
Pabst

(10) Patent No.: US 12,518,448 B2
(45) Date of Patent: Jan. 6, 2026

(54) GENERATING A COLLAGE COMPOSITION OF DIGITAL CONTENT

(71) Applicant: SAMSUNG ELECTRONICS CO., LTD., Suwon-si (KR)

(72) Inventor: Heinz B. Pabst, New York, NY (US)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 18/159,166

(22) Filed: Jan. 25, 2023

(65) Prior Publication Data
US 2024/0249455 A1 Jul. 25, 2024

(51) Int. Cl.
*G06T 11/60* (2006.01)
*G06T 3/40* (2006.01)

(52) U.S. Cl.
CPC ............... *G06T 11/60* (2013.01); *G06T 3/40* (2013.01)

(58) Field of Classification Search
CPC ...................................................... G06T 11/60
See application file for complete search history.

(56) References Cited

U.S. PATENT DOCUMENTS

| | | | |
|---|---|---|---|
| 6,453,078 B2 * | 9/2002 | Bubie | H04N 1/00461 382/296 |
| 8,971,639 B2 | 3/2015 | Tang et al. | |
| 8,976,198 B2 | 3/2015 | Borders et al. | |
| 9,449,411 B2 | 9/2016 | Cok et al. | |
| 11,698,010 B2 | 7/2023 | Ehleskog et al. | |
| 2013/0239049 A1 * | 9/2013 | Perrodin | H04N 1/00453 715/781 |
| 2015/0177966 A1 * | 6/2015 | Ragusa | H04N 1/00198 345/648 |
| 2015/0371366 A1 | 12/2015 | Hilt | |
| 2017/0201685 A1 | 7/2017 | Brahmanapalli | |
| 2021/0357083 A1 * | 11/2021 | Aspinall | G06F 3/0485 |
| 2024/0095277 A1 * | 3/2024 | Kelkar | G06V 10/772 |

FOREIGN PATENT DOCUMENTS

CN 108428213 A 8/2018

\* cited by examiner

*Primary Examiner* — Di Xiao
(74) *Attorney, Agent, or Firm* — Sherman IP LLP; Kenneth L. Sherman; Steven Laut

(57) ABSTRACT

One embodiment provides a method comprising generating an ordered collection of digital content pieces. The digital content pieces are in an order based on features of the digital content pieces or metadata corresponding to the digital content pieces. The method further comprises generating a placement grid comprising a plurality of cells, receiving a placement mask representing one or more virtual shapes, and determining, based on the placement mask, a set of cells of the placement grid that represents available space on the placement grid for placement of the digital content pieces. The method further comprises generating, based on the set of cells and the order of the digital content pieces, a collage composition of the digital content pieces. Generating the collage composition comprises placing the digital content pieces within the set of cells such that an amount of the available space on the placement grid is minimized.

20 Claims, 7 Drawing Sheets

GENERATING A COLLAGE COMPOSITION OF DIGITAL CONTENT

TECHNICAL FIELD

One or more embodiments generally relate to visual displays of digital content, in particular, automatically generating a collage composition of digital content.

BACKGROUND

A collage composition is a visual representation made from an assembly of different digital content pieces (e.g., digital images, digital art, digital videos, etc.) creating a new whole.

SUMMARY

One embodiment provides a method comprising generating an ordered collection of digital content pieces. The digital content pieces are in an order based on features of the digital content pieces or metadata corresponding to the digital content pieces. The method further comprises generating a placement grid comprising a plurality of cells, receiving a placement mask representing one or more virtual shapes, and determining, based on the placement mask, a set of cells of the placement grid that represents available space on the placement grid for placement of the digital content pieces. The method further comprises generating, based on the set of cells and the order of the digital content pieces, a collage composition of the digital content pieces. Generating the collage composition comprises placing the digital content pieces within the set of cells such that an amount of the available space on the placement grid is minimized.

One embodiment provides a system comprising at least one processor and a non-transitory processor-readable memory device storing instructions that when executed by the at least one processor causes the at least one processor to perform operations. The operations include generating an ordered collection of digital content pieces. The digital content pieces are in an order based on features of the digital content pieces or metadata corresponding to the digital content pieces. The operations further include generating a placement grid comprising a plurality of cells, receiving a placement mask representing one or more virtual shapes, and determining, based on the placement mask, a set of cells of the placement grid that represents available space on the placement grid for placement of the digital content pieces. The operations further include generating, based on the set of cells and the order of the digital content pieces, a collage composition of the digital content pieces. Generating the collage composition comprises placing the digital content pieces within the set of cells such that an amount of the available space on the placement grid is minimized.

One embodiment provides a non-transitory processor-readable medium that includes a program that when executed by a processor performs a method. The method comprises generating an ordered collection of digital content pieces. The digital content pieces are in an order based on features of the digital content pieces or metadata corresponding to the digital content pieces. The method further comprises generating a placement grid comprising a plurality of cells, receiving a placement mask representing one or more virtual shapes, and determining, based on the placement mask, a set of cells of the placement grid that represents available space on the placement grid for placement of the digital content pieces. The method further comprises generating, based on the set of cells and the order of the digital content pieces, a collage composition of the digital content pieces. Generating the collage composition comprises placing the digital content pieces within the set of cells such that an amount of the available space on the placement grid is minimized.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
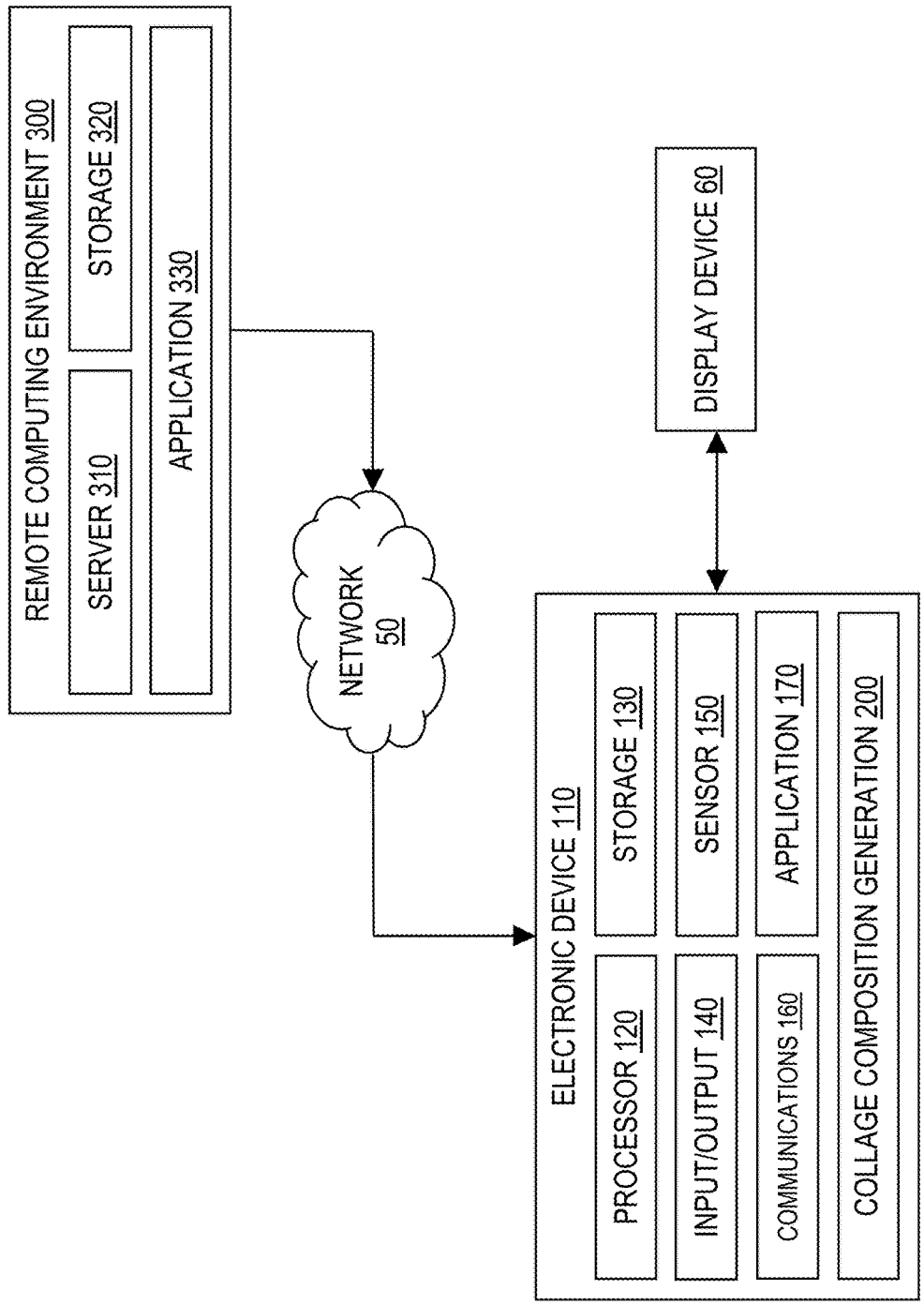
FIG. 1 illustrates an example computing architecture for implementing automatic generation of collage compositions of digital content, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to visual displays of digital content, in particular, automatically generating a collage composition of digital content. One embodiment provides a method comprising generating an ordered collection of digital content pieces. The digital content pieces are in an order based on features of the digital content pieces or metadata corresponding to the digital content pieces. The method further comprises generating a placement grid comprising a plurality of cells, receiving a placement mask representing one or more virtual shapes, and determining, based on the placement mask, a set of cells of the placement grid that represents available space on the placement grid for placement of the digital content pieces. The method further comprises generating, based on the set of cells and the order of the digital content pieces, a collage composition of the digital content pieces. Generating the collage composition comprises placing the digital content pieces within the set of cells such that an amount of the available space on the placement grid is minimized.

One embodiment provides a system comprising at least one processor and a non-transitory processor-readable memory device storing instructions that when executed by the at least one processor causes the at least one processor to perform operations. The operations include generating an ordered collection of digital content pieces. The digital content pieces are in an order based on features of the digital content pieces or metadata corresponding to the digital content pieces. The operations further include generating a placement grid comprising a plurality of cells, receiving a placement mask representing one or more virtual shapes, and determining, based on the placement mask, a set of cells of the placement grid that represents available space on the placement grid for placement of the digital content pieces. The operations further include generating, based on the set of cells and the order of the digital content pieces, a collage composition of the digital content pieces. Generating the collage composition comprises placing the digital content pieces within the set of cells such that an amount of the available space on the placement grid is minimized.

One embodiment provides a non-transitory processor-readable medium that includes a program that when executed by a processor performs a method. The method comprises generating an ordered collection of digital content pieces. The digital content pieces are in an order based on features of the digital content pieces or metadata corresponding to the digital content pieces. The method further comprises generating a placement grid comprising a plurality of cells, receiving a placement mask representing one or more virtual shapes, and determining, based on the placement mask, a set of cells of the placement grid that represents available space on the placement grid for placement of the digital content pieces. The method further comprises generating, based on the set of cells and the order of the digital content pieces, a collage composition of the digital content pieces. Generating the collage composition comprises placing the digital content pieces within the set of cells such that an amount of the available space on the placement grid is minimized.

Electronic devices with digital displays (e.g., phones, tablets, televisions (TVs), and personal computers) include software that enable display of collections of digital content such as, but not limited to, digital images (e.g., photos), digital art, and digital videos. Such software may include features and/or functionalities for displaying digital content as screensavers, in galleries, in social media feeds, etc. For example, a collection of digital images may be displayed by laying out the digital images into one or more compositions of one or more formats, such as in grids, collages, etc.

Many compositions are designed to provide visual continuity to users. For example, digital images can be collected and displayed in groups related to specific activities, locations, and/or durations of time. Users like to visualize and customize their galleries of digital content into compositions, and display or view the compositions on electronic devices with digital displays. One or more embodiments provide a framework for automatically generating collage compositions of digital content. Incorporating the framework into electronic devices provides users with ease of access to digital content and encourages the users to use the electronic devices for viewing the digital content.

In one embodiment, the framework automatically generates a collage composition satisfying one or more constraints. For example, digital images of the collage composition can be laid out on a surface within one or more virtual shapes. As another example, if overlap between the digital images is desired, locations on the surface where the digital images are laid out can have some predictable overlap. As another example, original aspect ratio of at least one of the digital images can be retained when the at least one digital image is laid out. As another example, the digital images can be laid out with visual continuity in order to improve appearance. As another example, the one or more virtual shapes can be customizable by a user. As another example, the number of digital images laid out within the one or more virtual shapes can be arbitrary. As another example, the digital images can span as much available space within the one or more virtual shapes as possible. As another example, some of the digital images can be displayed more prominently than others.

For expository purposes, the terms "collage" and "collage composition" are used interchangeably in this specification.

In one embodiment, the framework automatically generates a collage composition of digital images by implementing a multi-step process. In one embodiment, the process includes selecting an image placement mask representing one or more virtual shapes within which the digital images are laid out. The image placement mask may be automatically generated or generated/customized by a user.

In one embodiment, the process includes selecting a collection of digital images, and ordering the digital images of the collection based on features of the digital images and/or metadata corresponding to the digital images. For example, the collection may be selected from a user's digital photo album, and the digital images of the collection may be ordered based on time of capture of each of the digital images.

In one embodiment, the process includes determining, for each digital image of the collage composition, a corresponding size of the digital image, wherein the corresponding size may be larger or smaller than another digital image of the collage composition. This allows some digital images of the collage composition to appear more prominent than other digital images of the same collage composition. For each digital image of the collage composition, a corresponding size of the digital image may be automatically determined or determined/customized by a user. For example, in one embodiment, an image scale factor is iteratively determined using binary optimization, and the image scale factor is uniformly applied to a corresponding size of at least one digital image.

In one embodiment, the process includes placing the digital images of the collage composition within the one or more virtual shapes representing the image placement mask. In one embodiment, the digital images are placed such that the amount of unused space within the one or more virtual shapes is minimized. In one embodiment, original aspect ratio of at least one of the digital images is maintained/retained in order to reduce or eliminate distortion. In one embodiment, the digital images are placed such that there is no overlap or minimal overlap between the digital images, and all the digital images are fully visible. In one embodiment, to ensure visual continuity, a digital image of a collection is placed within proximity of another digital image of the same collection based on how the digital images are ordered.

Examples of digital content include, but are not limited to, Standard Definition (SD) images, SD videos, High Definition (HD) images, HD videos, 4K images (i.e., four times more pixels than HD), 4K videos, 8K images, 8K videos, etc.

FIG. 1 illustrates an example computing architecture 100 for implementing automatic generation of collage compositions of digital content, in one or more embodiments. The computing architecture 100 comprises an electronic device 110 including resources, such as one or more processor units 120 and one or more storage units 130. One or more applications 170 may execute/operate on the electronic device 110 utilizing the resources of the electronic device 110.

In one embodiment, the one or more applications 170 on the electronic device 110 include a collage composition generation system 200 configured to provide in-device processing. In one embodiment, the in-device processing includes automatically generating a collage composition of digital content for presentation on a display device (e.g., a high dynamic range (HDR) rendering display) 60 integrated in or coupled to the electronic device 110. As described in detail later herein, the system 200 is configured to: (1) select an image placement mask representing one or more virtual shapes, (2) select a collection of digital content, wherein the collection comprises a plurality of digital content pieces (e.g., a HD image, a HD video, etc.), (3) order the digital content pieces based on features of the digital content pieces and/or metadata corresponding to the digital content pieces, (4) determine, for each of the digital content pieces, a corresponding size of the digital content piece, and (5) place the digital content pieces within the one or more virtual shapes representing the image placement mask, resulting in a collage composition comprising the digital content pieces laid out within the one or more virtual shapes, wherein the collage composition is rendered on the display device 60. In one embodiment, the display device 60 is a consumer display for viewing.

Examples of an electronic device 110 that the display device 60 is integrated into or coupled to include, but are not limited to, a television (TV) (e.g., a smart TV), a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, a video camera, a media playback device (e.g., a DVD player), a set-top box, an Internet of things (IOT) device, a cable box, a satellite receiver, etc.

In one embodiment, the electronic device 110 comprises one or more sensor units 150 integrated in or coupled to the electronic device 110. In one embodiment, the one or more sensor units 150 include, but are not limited to, a camera, a microphone, a GPS, a motion sensor, etc. In one embodiment, at least one of the sensor units 150 is integrated in (i.e., pre-installed) or coupled (attached) to the display device 60.

In one embodiment, the electronic device 110 comprises one or more input/output (I/O) units 140 integrated in or coupled to the electronic device 110. In one embodiment, the one or more I/O units 140 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 140 to adjust/tune one or more tunable parameters, configure one or more pre-determined thresholds, provide user input, etc.

In one embodiment, the one or more applications 170 on the electronic device 110 may further include one or more software mobile applications loaded onto or downloaded to the electronic device 110, such as a camera application, a photo gallery application, an application for image and video viewing and editing, a social media application, a video streaming application, etc. A software mobile application on the electronic device 110 may exchange data with the system 200.

In one embodiment, the electronic device 110 comprises a communications unit 160 configured to exchange data with the display device 60. The communications unit 160 is further configured to exchange data with a remote computing environment 300 (e.g., receiving an image from the remote computing environment 300), over a communications network/connection 50 (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the electronic device 110 and other devices connected to the same communications network 50. The communications unit 160 may be operative to interface with a communications network using any suitable communications protocol such as, for example, Wi-Fi (e.g., an IEEE 802.11 protocol), Bluetooth®, high frequency systems (e.g., 900 MHZ, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 300 includes resources, such as one or more servers 310 and one or more storage units 320. One or more applications 330 that provide higher-level services may execute/operate on the remote computing environment 300 utilizing the resources of the remote computing environment 300.

In one embodiment, the remote computing environment 300 provides an online platform for hosting one or more online services (e.g., a video streaming service, etc.) and/or distributing one or more software mobile applications. As another example, the system 200 may be loaded onto or downloaded to the electronic device 110 from a remote computing environment 300 that maintains and distributes updates for the system 200. As yet another example, a remote computing environment 300 may comprise a cloud computing environment providing shared pools of configurable computing system resources and higher-level services.

Figure 2:
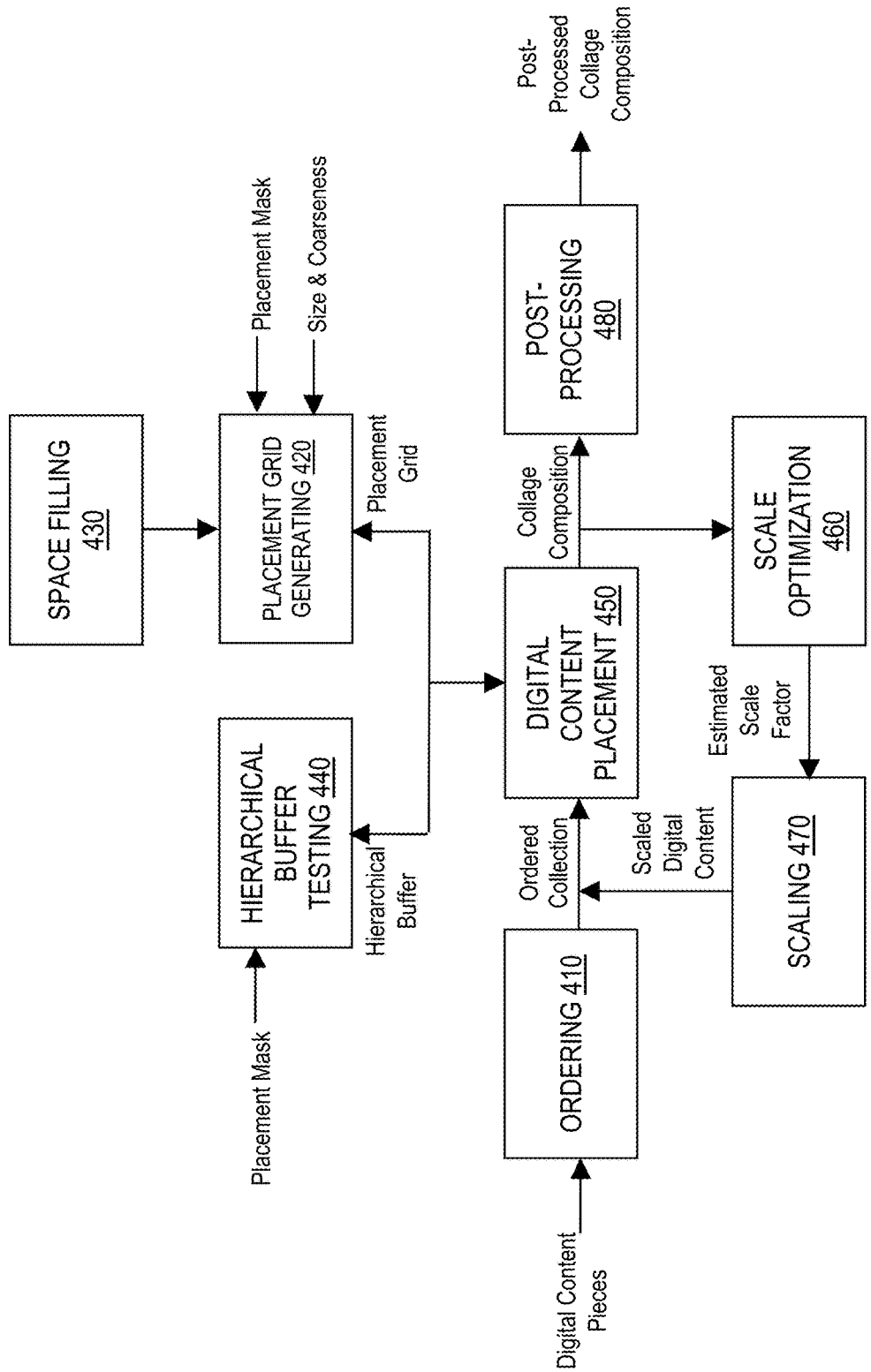
FIG. 2 illustrates an example collage composition generation system, in one or more embodiments.

FIG. 2 illustrates an example collage composition generation system 400, in one or more embodiments. In one embodiment, one or more components of the system 400 is integrated into, or implemented as part of, the system 200 in FIG. 1.

In one embodiment, the system 400 comprises an ordering unit 410 configured to: (1) receive, as input, a plurality of digital content pieces selected from a collection, and (2) order the digital content pieces of the collection based on features extracted from the digital content pieces and/or metadata corresponding to the digital content pieces, resulting in an ordered collection of digital content pieces. In one embodiment, the collection is maintained locally on an electronic device 110 and/or remotely on a remote computing environment 300. In one embodiment, the digital content pieces are automatically selected (e.g., via the ordering unit 410) or selected by a user (e.g., by interacting with one or more I/O units 140).

In one embodiment, the ordered collection includes the digital content pieces in a linear order. The features extracted from the digital content pieces are indicative of one or more representations captured within the digital content pieces such as, but not limited to, one or more objects (e.g., car, human, animal, etc.) captured within the digital content pieces. The metadata corresponding to the digital content pieces are indicative of one or more properties of the digital content pieces such as, but not limited to, time of capture, geographic location, etc.

In one embodiment, the system 400 comprises a placement grid generating unit 420 configured to: (1) receive, as input, a size value, (2) receive, as input, a coarseness value, and (3) generate, based on the size value and the coarseness value, a placement grid. The placement grid is a data structure comprising a plurality of cells arranged across a plurality of rows and a plurality of columns. Dimensions (i.e., width, height) of the placement grid are based on the size value and the coarseness value. In one embodiment, the coarseness value is a factor that the placement grid generating unit 420 applies to the size value to determine a number of rows of the placement grid and a number of columns of the placement grid.

Each cell of the placement grid is classified as one of the following: unmarkable, markable, or marked. Each unmarkable cell of the placement grid represents a cell that cannot be occupied (i.e., covered) by a digital content piece of the ordered collection. Each markable cell of the placement grid represents a cell that is available for a digital content piece of the ordered collection to occupy (i.e., cover). As described in detail later herein, a digital content piece of the ordered collection may be assigned to one or more markable cells of the placement grid for placement. Each marked cell of the placement grid represents a cell that is already assigned to a digital content piece of the ordered collection for placement.

In one embodiment, the system 400 comprises a space filling unit 430 configured to provide a function for filling available space on a surface. In one embodiment, the function includes a curve ("space filling curve"). For example, in one embodiment, the space filling curve is a spiral matrix.

In one embodiment, the placement grid generating unit 420 is configured to: (1) receive, as input, a space filling curve (e.g., from the space filling unit 430), and (2) generate, based on the space filling curve, one or more links linking one or more cells of the placement grid to one or more other cells of the placement grid and ordered in accordance with an order (e.g., linear order) of the ordered collection, resulting in the placement grid including ordered linked cells. As described in detail later herein, an order by which the links of the placement grid are ordered controls an order by which the placement grid is tested for available space for placement of a digital content piece.

The order by which the links of the placement grid are ordered affects visual continuity of a collage composition generated using the placement grid. For example, if the space filling curve is a spiral matrix, one or more digital content pieces of the ordered collection that are within proximity of one or more other digital content pieces of the same ordered collection will be placed near one another in radial bands around a center of the collage composition.

In one embodiment, the placement grid generating unit 420 is configured to: (1) receive, as input, a placement mask representing one or more virtual shapes, and (2) classify each cell of the placement grid based on the placement mask. The placement grid generating unit 420 utilizes the placement mask to determine which cells of the placement grid to classify as unmarkable (i.e., cannot be occupied/covered by a digital content piece of the ordered collection) and which remaining cells of the placement grid to classify as markable (i.e., available for a digital content piece of the ordered collection to occupy/cover). For example, if the one or more virtual shapes represented by the placement mask overlaps one or more cells of the placement grid, the one or more cells are classified as markable, thereby ensuring that all digital content pieces of the ordered collection are laid out within the one or more virtual shapes.

In one embodiment, the system 400 comprises a hierarchical buffer generating unit 440 configured to: (1) receive, as input, data corresponding to the placement grid (e.g., from the placement grid generating unit 420), and (2) generate a hierarchical buffer representing the same data as the data corresponding to the placement grid. In one embodiment, the hierarchical buffer is a hierarchical z-buffer or a two-dimensional (2D) spatial index.

In one embodiment, the hierarchical buffer generating unit 440 is further configured to: (1) receive, as input, the placement mask representing the one or more virtual shapes, and (2) classify each region of the hierarchical buffer based on the placement mask. The hierarchical buffer generating unit 440 utilizes the placement mask to determine which regions of the hierarchical buffer to classify as unmarkable (i.e., cannot be occupied/covered by a digital content piece of the ordered collection) and which remaining regions of the hierarchical buffer to classify as markable (i.e., available for a digital content piece of the ordered collection to occupy/cover). The hierarchical buffer allows for accelerated testing of placement of each digital content piece of the ordered collection on markable regions of the hierarchical buffer.

In one embodiment, the system 400 comprises a digital placement unit 450 configured to: (1) receive, as input, the ordered collection of digital content pieces (e.g., from the ordering unit 410), (2) receive, as input, the placement grid (e.g., from the placement grid generating unit 420), (3) for each digital content piece of the ordered collection, determine a corresponding placement of the digital content piece on the placement grid, and (4) generate a collage composition by placing each digital content piece of the ordered collection on the placement grid in accordance with a corresponding placement determined.

In one embodiment, the placement unit 450 is further configured to: (1) receive, as input, a hierarchical buffer (e.g., from the hierarchical buffer generating unit 440), and (2) for each digital content piece of the ordered collection, test a corresponding placement of the digital content piece on one or more markable regions of the hierarchical buffer.

Markable regions of the placement grid represents available space on the placement grid for placement of digital content pieces. In one embodiment, the digital content pieces of the ordered collection are placed (via the placement unit 450) on the placement grid to occupy as much of the available space on the placement grid as possible, thereby optimizing maximum usage of the available space on the placement grid.

In one embodiment, the system 400 comprises a scale optimization unit 460 and a scaling unit 470. In one embodiment, the placement unit 450 utilizes the scale optimization unit 460 and the scaling unit 470 to implement an iterative process for optimizing maximum usage of the available space on the placement grid.

In one embodiment, the iterative process involves iteratively determining, using binary optimization, a scale factor to uniformly apply to a size of each digital content piece of the ordered collection. For example, in a first/current iteration of the iterative process, the scale optimization unit 460 is configured to estimate a scale factor to uniformly apply to a size of each digital content piece of the ordered collection. In the first/current iteration, the scaling unit 470 is configured to scale a size of each digital content piece of the ordered collection by applying the estimated scale factor to the size of the digital content piece. In the first/current iteration, for each scaled digital content piece, the placement unit 450 is configured to select a position representing a markable cell of the ordered linked cells that is next in order, and test and place the scaled digital content piece at the selected position using the hierarchical buffer and the placement grid. If the scaled digital content piece intersects/overlaps with a marked cell of the ordered linked cells, placement of the scaled digital content piece at the selected position is rejected, and a new position representing another unmarked cell of the ordered linked cells that is next in order is selected.

If the placement unit 450 successfully places all scaled digital content pieces and the estimated scale factor is optimum (i.e., usage of the available space on the placement grid is maximized), the placement unit 450 classifies regions of the hierarchical buffer and cells of the placement grid that are occupied/covered by the scaled digital content pieces as marked, and returns bounding boxes representing positions of the scaled digital content pieces on the hierarchical buffer and the placement grid. The iterative process ends as the estimated scale factor maximizes usage of the available space on the placement grid.

If the placement unit 450 successfully places all scaled digital content pieces but the estimated scale factor is not optimum (i.e., usage of the available space on the placement grid is not maximized), the placement unit 450 triggers a next iteration of the iterative process during which the scaling unit 470 increases the estimated scale factor. Therefore, the estimated scale factor in the next iteration is a new scale factor that is larger than the estimated scale factor in the first/current iteration.

If the placement unit 450 fails to place at least one scaled digital content piece (e.g., placement of the at least one scaled digital content piece is unsuccessful because no more positions representing unmarked cells of the ordered linked cells are available for selection), the placement unit 450 resets the hierarchical buffer and the placement grid, and triggers the next iteration of the iterative process during which the scaling unit 470 decreases the estimated scale factor. Therefore, the estimated scale factor in the next iteration is a new scale factor that is smaller than the estimated scale factor in the first/current iteration. The iterative process ensures that each digital content piece of the ordered collection is tested and placed.

In one embodiment, the iterative process ends when one of the following conditions occurs: (1) an estimated scale factor in a current iteration of the iterative process is optimum, (2) a pre-determined maximum number of iterations has elapsed, or (3) an estimated scale factor in a current iteration of the iterative process is within some error bound or epsilon value of an estimated scale factor in a prior iteration of the iterative process.

In one embodiment, each digital content piece of the collage composition is placed such that it is not occluded by another digital content piece of the collage composition. In one embodiment, each digital content piece of the collage composition is sized based on its relative size to other digital content pieces of the collage composition. In one embodiment, all digital content pieces of the collage composition are placed within the available space (determined by the placement mask) on the placement grid. In one embodiment, the digital content pieces of the collage composition are sized to maximize usage of the available space on the placement grid. In one embodiment, the digital content pieces of the collage composition retain its original aspect ratio.

In one embodiment, the system 400 comprises a post-processing unit 480 configured to: (1) receive, as input, the collage composition (e.g., from the placement unit 450), and (2) apply one or more post-processing and rendering techniques to the collage composition, resulting in a post-processed collage composition for presentation on the display device 60. For example, in one embodiment, the techniques may include visual styling techniques such as, but not limited to, borders, additional spacing between digital content pieces, expanding digital content pieces to create overlap, etc.

In one embodiment, the system 400 facilitates the creation of virtual galleries of digital content pieces (e.g., virtual art galleries, virtual photo galleries) by reducing or removing the need for human intervention in organizing placement of digital content pieces within the galleries.

A companion application for a display device 60 (e.g., a smart TV) is a software application that allows users to select digital content pieces for display on the display device 60 with various templates. In one embodiment, the system 400 may be incorporated into the companion application to support automatic generation of virtual galleries, thereby supplementing the companion application's template-based approach.

A display device 60 may have multiple operating modes, such as an ambient mode during which virtual galleries may be displayed on the display device 60. In one embodiment, the system 400 may be incorporated into the display device 60 to support automatic generation of virtual galleries for display during the ambient mode.

In one embodiment, the system 400 may be incorporated in software to provide features and/or functionalities such as, but not limited to, displaying digital content as screensavers, automatically generating digital galleries, posting digital content in social media feeds, generating formats or layouts (e.g., grids, collages) of digital content for use when the digital content is printed (e.g., as printed media, such as photo books), automatically generating digital scrap books, etc. For example, a collection of digital images may be displayed by laying out the digital images into one or more compositions of one or more formats, such as in grids, collages, etc.

Figure 3:
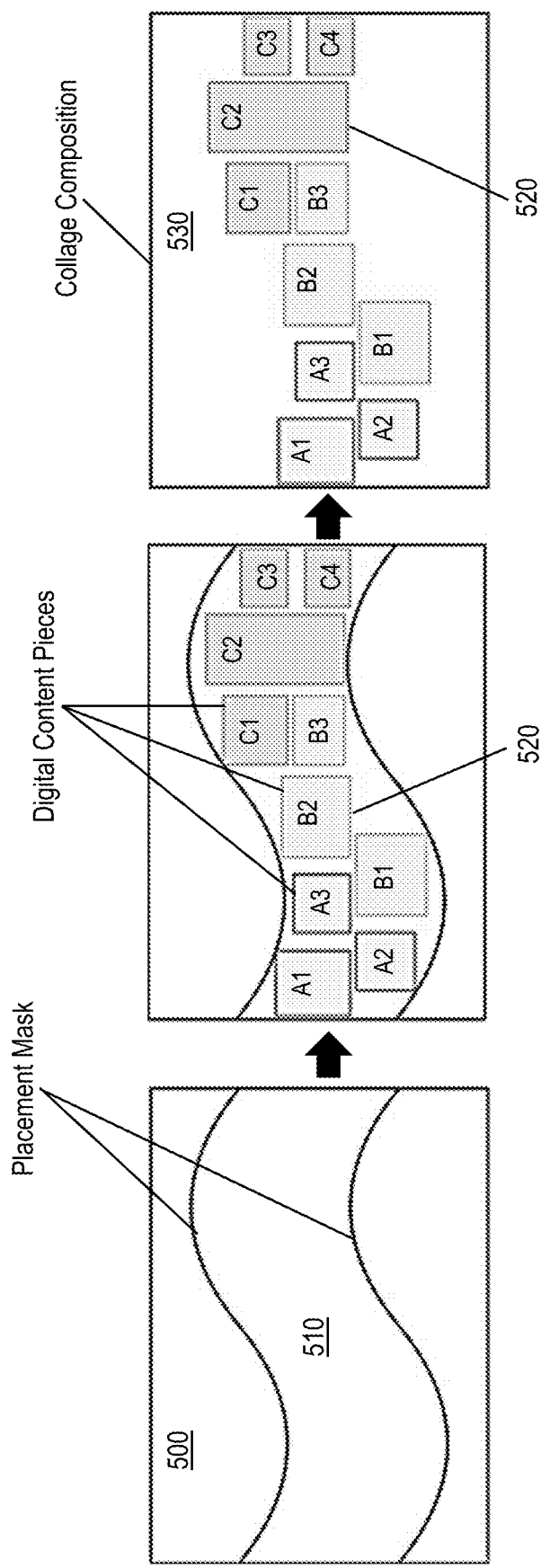
FIG. 3 illustrates an example placement mask and an example collage composition resulting from use of the placement mask, in one or more embodiments.

FIG. 3 illustrates an example placement mask 510 and an example collage composition 530 resulting from use of the placement mask 510, in one or more embodiments. In one embodiment, the system 400 generates a placement grid 500, and classifies each cell of the placement grid 500 as either markable or unmarkable based on a placement mask 510 representing one or more virtual shapes. For example, as shown in FIG. 3, the placement mask 510 represents a banner shape overlaid on the placement grid 500. Each cell within the banner shape is classified as markable, and each cell outside of the banner shape is classified as unmarkable.

The system 400 orders digital content pieces 520 of a collection based on features extracted from the digital content pieces 520 and/or metadata corresponding to the digital content pieces 520, resulting in an ordered collection of the digital content pieces 520. For example, as shown in FIG. 3, the ordered collection includes the following digital content pieces 520 in linear order: A1, A2, A3, B1, B2, B3, C1, C2, C3, and C4.

For each digital content piece 520 of the ordered collection, the system 400 assigns the digital content piece 520 to one or more markable cells of the placement grid 500. The system 400 places all the digital content pieces 520 of the ordered collection within the banner shape in a manner that minimizes an amount of unused space within the banner shape, resulting in a collage composition 530.

To ensure visual continuity, the system 400 places each digital content piece 520 of the ordered collection within proximity of another digital content piece 520 of the same ordered collection based on how the digital content pieces 520 are ordered. For example, as shown in FIG. 3, the digital content pieces A1, A2, and A3 are placed within proximity of one another to form a first grouping, the digital content pieces B1, B2, and B3 are placed within proximity of one another to form a second grouping, and the digital content pieces C1, C2, C3, and C4 are placed within proximity of one another to form a third grouping. Each grouping may be representative of one or more objects (e.g., car, human, animal, etc.) captured within the digital content pieces or one or more properties of the digital content pieces (e.g., time of capture, geographic location, etc.).

Figure 4:
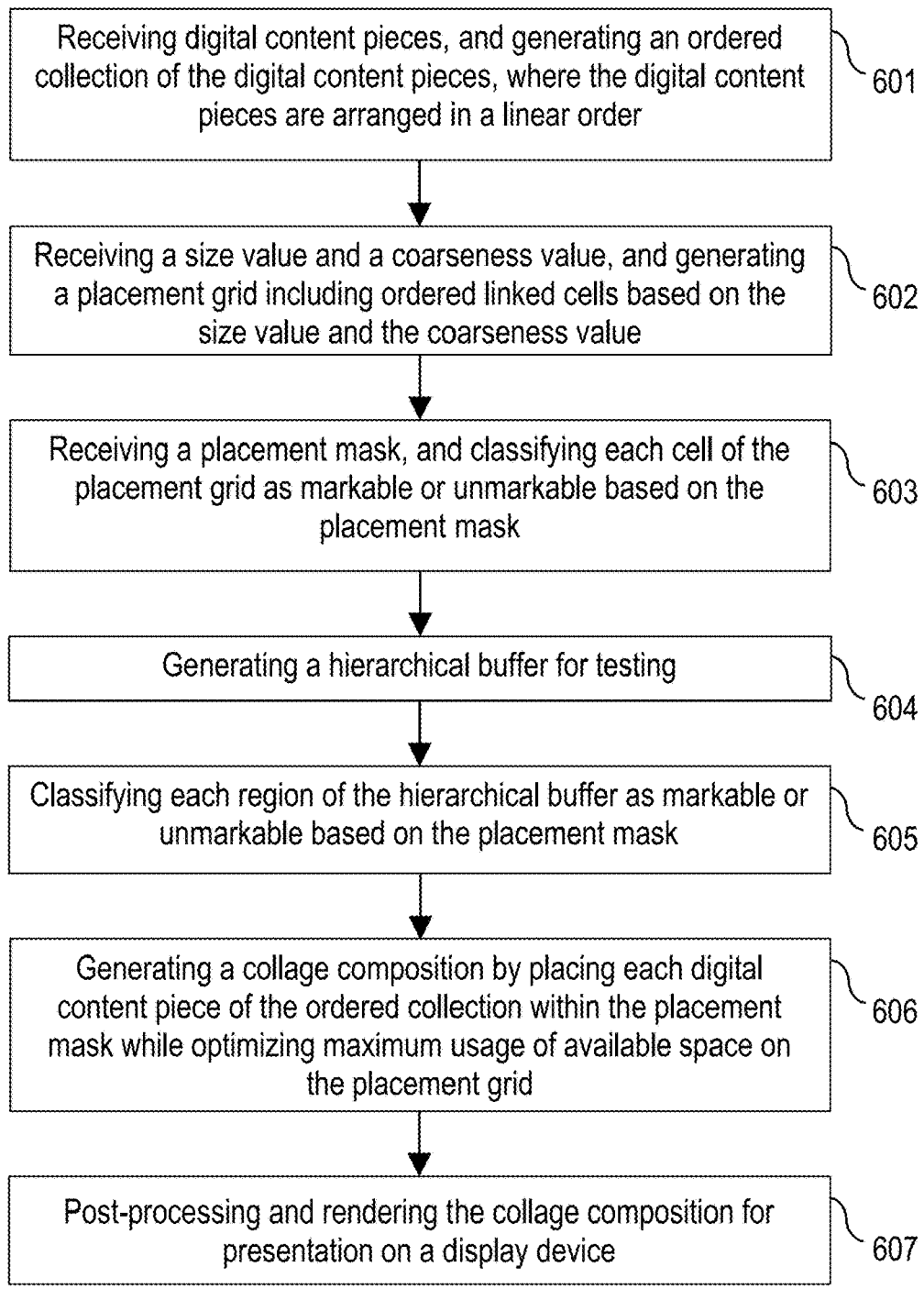
FIG. 4 is a flowchart of an example process implemented by the collage composition generation system, in one or more embodiments.

FIG. 4 is a flowchart of an example process 600 implemented by the system 400, in one or more embodiments. Process block 601 includes receiving digital content pieces, and generating an ordered collection of the digital content pieces, where the digital content pieces are arranged in a linear order. Process block 602 includes receiving a size value and a coarseness value, and generating a placement grid including ordered linked cells based on the size value and the coarseness value. Process block 603 includes receiving a placement mask, and classifying each cell of the placement grid as markable or unmarkable based on the placement mask. Process block 604 includes generating a hierarchical buffer for testing. Process block 605 includes classifying each region of the hierarchical buffer as markable or unmarkable based on the placement mask. Process block 606 includes generating a collage composition by placing each digital content piece of the ordered collection within the placement mask while optimizing maximum usage of available space on the placement grid. Process block 607 includes post-processing and rendering the collage composition for presentation on a display device.

In one embodiment, process blocks 601-607 may be performed by one or more components of the collage composition generation system 400.

Figure 5:
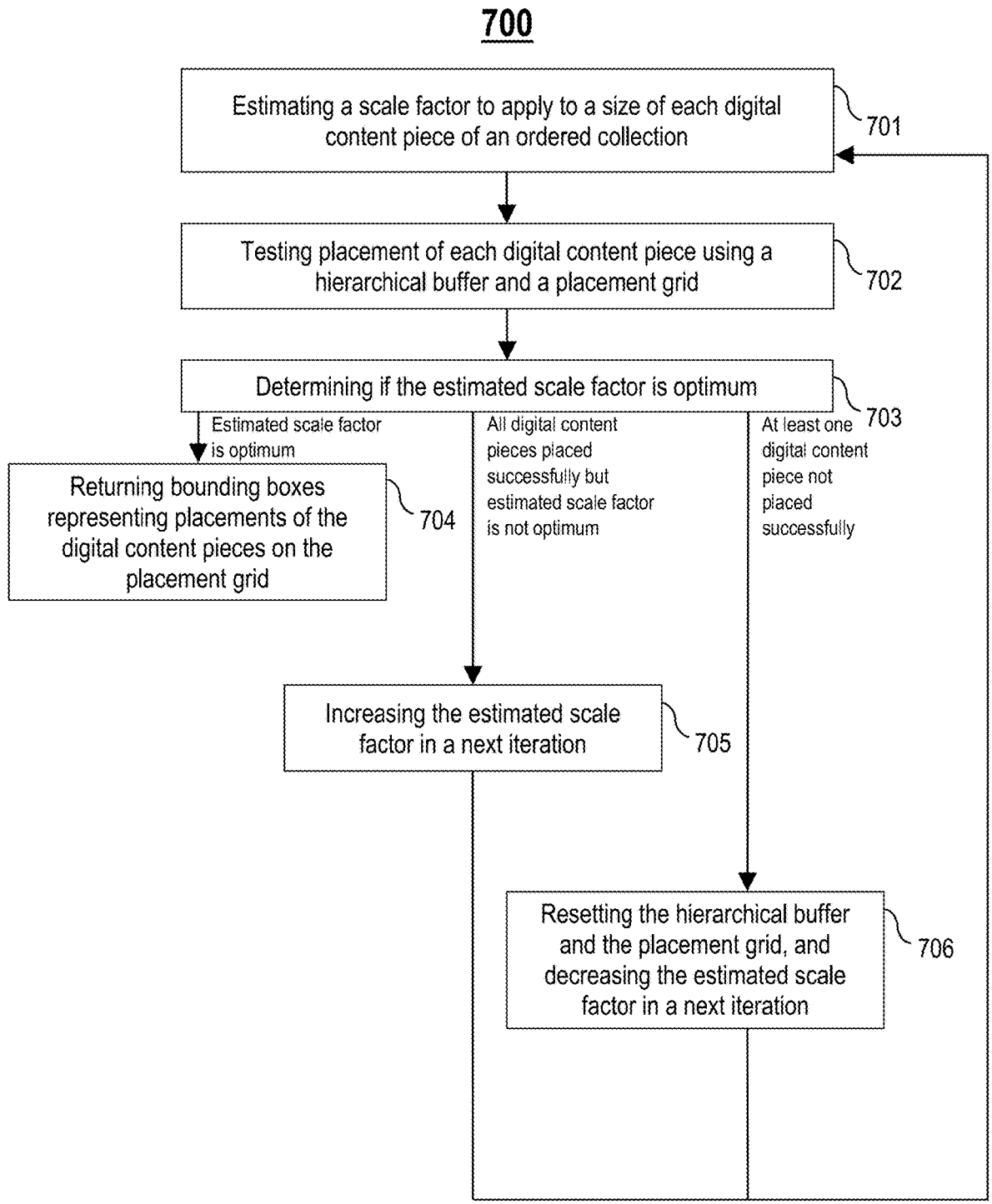
FIG. 5 is a flowchart of an example iterative process for optimizing maximum usage of available space on a placement grid, in one or more embodiments.

FIG. 5 is a flowchart of an example iterative process 700 for optimizing maximum usage of available space on a placement grid, in one or more embodiments. Process block 701 includes estimating a scale factor to apply to a size of each digital content piece of an ordered collection. Process block 702 includes testing placement of each digital content piece using a hierarchical buffer and a placement grid. Process block 703 includes determining if the estimated scale factor is optimum.

If the estimated scale factor is optimum, proceed to process block 704. Process block 704 includes returning bounding boxes representing placements of the digital content pieces on the placement grid.

If all the digital content pieces are placed successfully but the estimated scale factor is not optimum, proceed to process block 705. Process block 705 includes increasing the estimated scale factor in a next iteration.

If at least one of the digital content pieces is not placed successfully, proceed to process block 706. Process block 706 includes resetting the hierarchical buffer and the placement grid, and decreasing the estimated scale factor in a next iteration.

In one embodiment, process blocks 701-706 may be performed by one or more components of the collage composition generation system 400.

Figure 6:
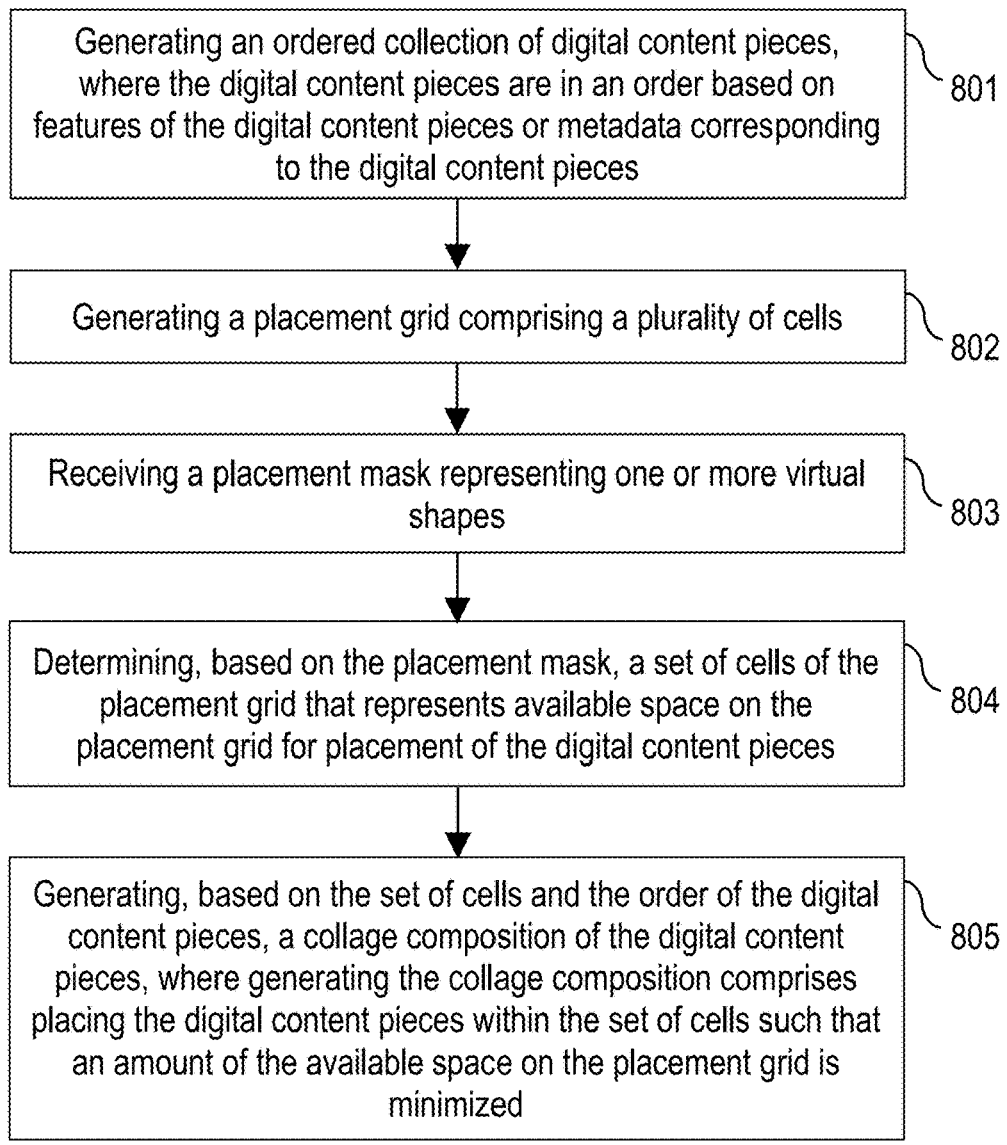
FIG. 6 is a flowchart of an example process for automatically generating a collage composition of digital content, in one or more embodiments.

FIG. 6 is a flowchart of an example process 800 for automatically generating a collage composition of digital content, in one or more embodiments. Process block 801 includes generating an ordered collection of digital content pieces, where the digital content pieces are in an order based on features of the digital content pieces or metadata corresponding to the digital content pieces. Process block 802 includes generating a placement grid comprising a plurality of cells. Process block 803 includes receiving a placement mask representing one or more virtual shapes. Process block 804 includes determining, based on the placement mask, a set of cells of the placement grid that represents available space on the placement grid for placement of the digital content pieces. Process block 805 includes generating, based on the set of cells and the order of the digital content pieces, a collage composition of the digital content pieces, where generating the collage composition comprises placing the digital content pieces within the set of cells such that an amount of the available space on the placement grid is minimized.

In one embodiment, process blocks 801-805 may be performed by one or more components of the collage composition generation system 400.

Figure 7:
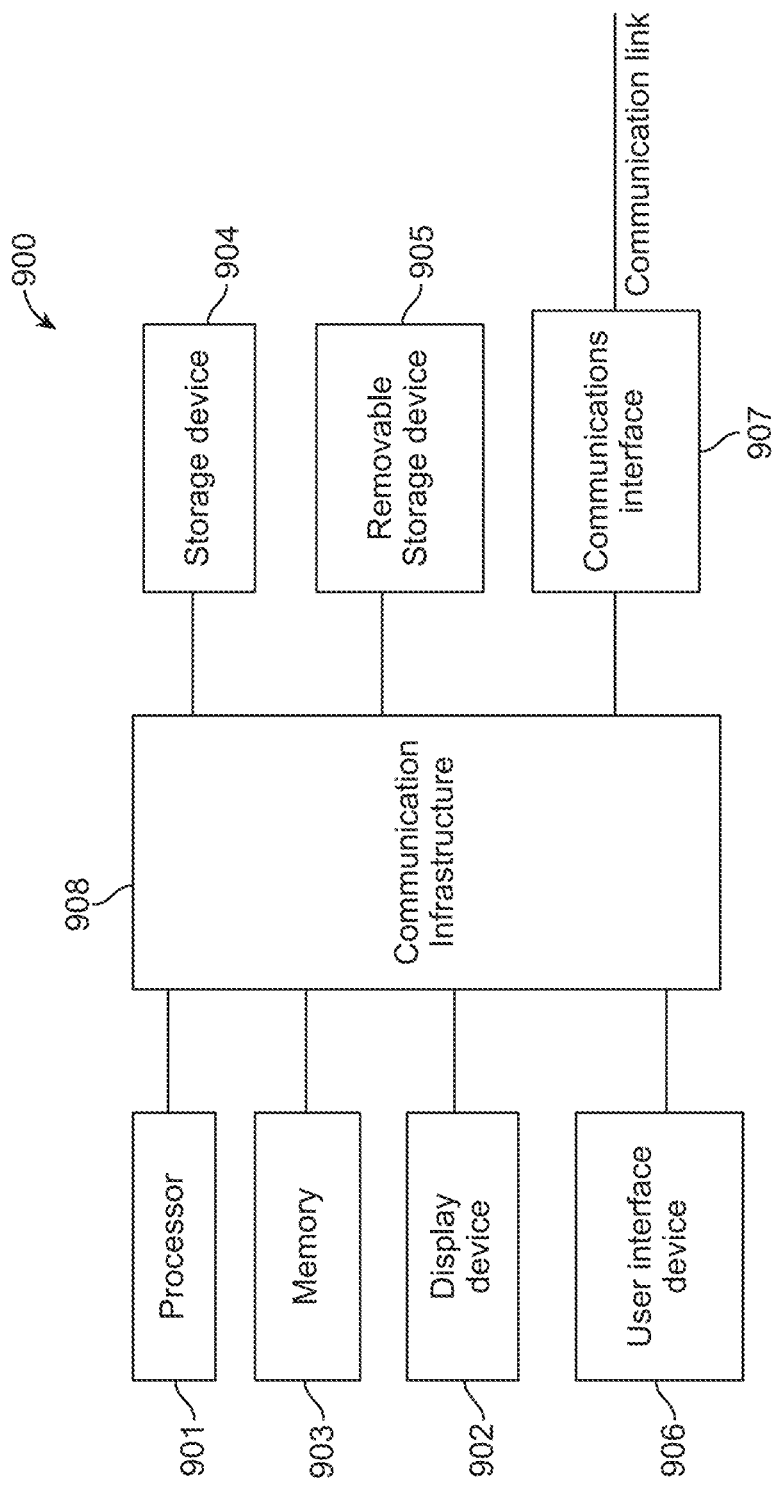
FIG. 7 is a high-level block diagram showing an information processing system comprising a computer system useful for implementing the disclosed embodiments.

FIG. 7 is a high-level block diagram showing an information processing system comprising a computer system 900 useful for implementing the disclosed embodiments. The systems 200 and/or 400 may be incorporated in the computer system 900. The computer system 900 includes one or more processors 901, and can further include an electronic display device 902 (for displaying video, graphics, text, and other data), a main memory 903 (e.g., random access memory (RAM)), storage device 904 (e.g., hard disk drive), removable storage device 905 (e.g., removable storage drive, removable memory module, a magnetic tape drive, optical disk drive, computer readable medium having stored therein computer software and/or data), viewer interface device 906 (e.g., keyboard, touch screen, keypad, pointing device), and a communication interface 907 (e.g., modem, a network interface (such as an Ethernet card), a communications port, or a PCMCIA slot and card). The communication interface 907 allows software and data to be transferred between the computer system and external devices. The system 900 further includes a communications infrastructure 908 (e.g., a communications bus, cross-over bar, or network) to which the aforementioned devices/modules 901 through 907 are connected.

Information transferred via communications interface 907 may be in the form of signals such as electronic, electromagnetic, optical, or other signals capable of being received by communications interface 907, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 600 (FIG. 4), process 700 (FIG. 5), and/or process 800 (FIG. 6) may be stored as program instructions on the memory 903, storage device 904, and/or the removable storage device 905 for execution by the processor 901.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
    generating an ordered collection of digital content pieces, wherein the digital content pieces are in an order based on features of the digital content pieces or metadata corresponding to the digital content pieces;
    generating a placement grid comprising a plurality of cells;
    receiving a placement mask representing one or more virtual shapes;
    determining, based on the placement mask, a set of cells of the placement grid that represents available space on the placement grid for placement of the digital content pieces;
    generating, based on a curve, one or more links linking one or more cells of the placement grid to one or more other cells of the placement grid; and
    generating, based on the set of cells and the order of the digital content pieces, a collage composition of the digital content pieces, wherein generating the collage composition comprises placing the digital content pieces within the set of cells such that an amount of the available space on the placement grid is minimized.

2. The method of claim 1, wherein the order of the digital content pieces is a linear order.

3. The method of claim 1, wherein the curve is a space filling curve, and the one or more links are ordered in accordance with the order of the digital content pieces.

4. The method of claim 3, wherein the space filling curve is a spiral matrix.

5. The method of claim 3, further comprising:
    generating a hierarchical buffer; and
        testing placement of each of the digital content pieces using the hierarchical buffer, the placement grid, and the one or more links.

6. The method of claim 1, wherein generating the collage composition further comprises:
    placing, on the placement grid, one of the digital content pieces within proximity of another one of the digital content pieces based on the order of the digital content pieces.

7. The method of claim 1, wherein generating the collage composition further comprises:
    estimating a scale factor; and
    scaling a size of each of the digital content pieces in accordance with the estimated scale factor.

8. The method of claim 7, wherein the estimated scale factor maximizes usage of the available space on the placement grid.

9. A system comprising:
    at least one processor; and
    a non-transitory processor-readable memory device storing instructions that when executed by the at least one processor causes the at least one processor to perform operations including:
    generating an ordered collection of digital content pieces, wherein the digital content pieces are in an order based on features of the digital content pieces or metadata corresponding to the digital content pieces;
    generating a placement grid comprising a plurality of cells;
    receiving a placement mask representing one or more virtual shapes;
    determining, based on the placement mask, a set of cells of the placement grid that represents available space on the placement grid for placement of the digital content pieces;
    generating, based on a curve, one or more links linking one or more cells of the placement grid to one or more other cells of the placement grid; and
    generating, based on the set of cells and the order of the digital content pieces, a collage composition of the digital content pieces, wherein generating the collage composition comprises placing the digital content pieces within the set of cells such that an amount of the available space on the placement grid is minimized.

10. The system of claim 9, wherein the order of the digital content pieces is a linear order.

11. The system of claim 9, wherein:
    the curve is a space filling curve; and
    the one or more links are ordered in accordance with the order of the digital content pieces.

12. The system of claim 11, wherein the space filling curve is a spiral matrix.

13. The system of claim 11, wherein the operations further include:
    generating a hierarchical buffer; and
        testing placement of each of the digital content pieces using the hierarchical buffer, the placement grid, and the one or more links.

14. The system of claim 9, wherein generating the collage composition further comprises:

placing, on the placement grid, one of the digital content pieces within proximity of another one of the digital content pieces based on the order of the digital content pieces.

15. The system of claim 9, wherein generating the collage composition further comprises:
estimating a scale factor; and
scaling a size of each of the digital content pieces in accordance with the estimated scale factor.

16. The system of claim 15, wherein the estimated scale factor maximizes usage of the available space on the placement grid.

17. A non-transitory processor-readable medium that includes a program that when executed by a processor performs a method comprising:
generating an ordered collection of digital content pieces, wherein the digital content pieces are in an order based on features of the digital content pieces or metadata corresponding to the digital content pieces;
generating a placement grid comprising a plurality of cells;
receiving a placement mask representing one or more virtual shapes;
determining, based on the placement mask, a set of cells of the placement grid that represents available space on the placement grid for placement of the digital content pieces;
generating, based on a curve, one or more links linking one or more cells of the placement grid to one or more other cells of the placement grid; and
generating, based on the set of cells and the order of the digital content pieces, a collage composition of the digital content pieces, wherein generating the collage composition comprises placing the digital content pieces within the set of cells such that an amount of the available space on the placement grid is minimized.

18. The non-transitory processor-readable medium of claim 17, wherein:
generating the collage composition further comprises:
placing, on the placement grid, one of the digital content pieces within proximity of another one of the digital content pieces based on the order of the digital content pieces;
the curve is a space filling curve; and
the one or more links are ordered in accordance with the order of the digital content pieces.

19. The non-transitory processor-readable medium of claim 17, wherein generating the collage composition further comprises:
estimating a scale factor; and
scaling a size of each of the digital content pieces in accordance with the estimated scale factor.

20. The non-transitory processor-readable medium of claim 19, wherein the estimated scale factor maximizes usage of the available space on the placement grid.

* * * * *